(12) United States Patent
Zewail et al.

(10) Patent No.: US 11,889,321 B2
(45) Date of Patent: Jan. 30, 2024

(54) UE BEAM SWITCHING CAPABILITY REPORTING AND ASSOCIATED SCHEDULING

(71) Applicant: QUALCOMM Incorporated, San Diego, CA (US)

(72) Inventors: Ahmed Abdelaziz Ibrahim Abdelaziz Zewail, San Diego, CA (US); Qiang Wu, San Diego, CA (US); Iyab Issam Sakhnini, San Diego, CA (US); Mehmet Izzet Gurelli, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 17/249,234

(22) Filed: Feb. 24, 2021

(65) Prior Publication Data

US 2021/0306866 A1    Sep. 30, 2021

Related U.S. Application Data

(60) Provisional application No. 62/994,006, filed on Mar. 24, 2020.

(51) Int. Cl.
| | |
|---|---|
| *H04W 16/28* | (2009.01) |
| *H04W 72/1263* | (2023.01) |
| *H04W 8/24* | (2009.01) |
| *H04W 72/23* | (2023.01) |

(52) U.S. Cl.
CPC ............ *H04W 16/28* (2013.01); *H04W 8/24* (2013.01); *H04W 72/1263* (2013.01); *H04W 72/23* (2023.01)

(58) Field of Classification Search
CPC ....... H04W 8/24; H04W 16/28; H04W 72/23; H04W 72/1263
See application file for complete search history.

(56) References Cited

U.S. PATENT DOCUMENTS

| | | | |
|---|---|---|---|
| 2019/0341989 A1* | 11/2019 | Raghavan | H04B 17/327 |
| 2019/0394634 A1* | 12/2019 | Akkarakaran | H04W 88/06 |
| 2021/0021330 A1* | 1/2021 | Khoshnevisan | H04L 27/2602 |
| 2022/0225320 A1* | 7/2022 | Li | H04B 7/0404 |

OTHER PUBLICATIONS

International Search Report and Written Opinion—PCT/US2021/019521—ISA/EPO—dated Jun. 9, 2021.

(Continued)

*Primary Examiner* — Sulaiman Nooristany
(74) *Attorney, Agent, or Firm* — Harrity & Harrity, LLP (57) ABSTRACT

Various aspects of the present disclosure generally relate to wireless communication. In some aspects, a user equipment (UE) may transmit an indication of a beam switching capability of the UE as a multiple of a physical layer timing unit for a wireless network in which the UE is located; and receive one or more scheduling grants that are based at least in part on the beam switching capability of the UE. Numerous other aspects are provided.

30 Claims, 7 Drawing Sheets

(56) References Cited

OTHER PUBLICATIONS

Qualcomm Incorporated: "Enhancements on Multi-beam Operation", 3GPP Draft, 3GPP TSG-RAN WG1 Ad-Hoc Meeting 1901, R1-1900906, Enhancements on Multi-beam Operation, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593752, 23 Pages, Retrieved from the Internet : URL: http://www.3gpp.org/ftp/Meetings%5F3GPP%5FSYNC/RAN1/Docs/R1%2D1900906%2Ezip. [retrieved on Jan. 20, 2019]sections 1-10.

Qualcomm Incorporated: "Remaining Details on QCL", 3GPP TSG RAN WG1 Meeting #91, 3GPP Draft, 3GPP TSG RAN WG1 Meeting #91, R1-1720672, 3rd Generation Partnership Project (3GPP), Mobile Competence Centre, 650, Route Des Lucioles, F-06921 Sophia-Antipolis Cedex, France, vol. RAN WG1, No. Reno, Nevada, USA; Nov. 27, 2017-Dec. 1, 2017, Nov. 18, 2017 (Nov. 18, 2017), pp. 1-9, XP051370133, Retrieved from the Internet: URL: http://www.3gpp.org/ftp/tsg_ran/WG1_RL1/TSGR1_91/Docs/, http://www.3gpp.org/ftp/tsg_ran/WG1_RL1/TSGR1_91/Docs/ [retrieved on Nov. 18, 2017] sections 1-3, the whole document.

Qualcomm Incorporated: "UE Adaptation to the Traffic and UE Power Consumption Characteristics", 3GPP Draft, 3GPP TSG-RAN WG1 Ad-Hoc Meeting 1901, R1-1900911 UE Adaptation for Power Saving, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593757, pp. 1-24, Retrieved from the Internet: URL: http://www.3gpp.org/ftp/tsg%5Fran/WG1%5FRL1/TSGR1%5FAH/NR%5FAH%5F1901/Docs/R1%2D1900911%2Ezip, [retrieved on Jan. 20, 2019], Chapters 1. 2.

\* cited by examiner

UE BEAM SWITCHING CAPABILITY REPORTING AND ASSOCIATED SCHEDULING

CROSS-REFERENCE TO RELATED APPLICATION

This Patent Application claims priority to U.S. Provisional Patent Application No. 62/994,006, filed on Mar. 24, 2020, entitled "UE BEAM SWITCHING CAPABILITY REPORTING AND ASSOCIATED SCHEDULING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for user equipment (UE) beam switching capability reporting and associated scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, and/or a 5G Node B, among other examples.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting an indication of a beam switching capability of the UE as a multiple of a physical layer timing unit for a wireless network in which the UE is located; and receiving one or more scheduling grants that are based at least in part on the beam switching capability of the UE.

In some aspects, a method of wireless communication, performed by a BS, may include receiving an indication of a beam switching capability of a UE as a multiple of a physical layer timing unit for a wireless network in which the BS and the UE are located; and transmitting one or more scheduling grants based at least in part on the beam switching capability of the UE.

In some aspects, a UE for wireless communication may include a memory and one or more processors operatively coupled to the memory. The memory and the one or more processors may be configured to transmit an indication of a beam switching capability of the UE as a multiple of a physical layer timing unit for a wireless network in which the UE is located; and receive one or more scheduling grants that are based at least in part on the beam switching capability of the UE.

In some aspects, a BS for wireless communication may include a memory and one or more processors operatively coupled to the memory. The memory and the one or more processors may be configured to receive an indication of a beam switching capability of a UE as a multiple of a physical layer timing unit for a wireless network in which the BS and the UE are located; and transmit one or more scheduling grants based at least in part on the beam switching capability of the UE.

In some aspects, a non-transitory computer-readable medium may store one or more instructions for wireless communication. The one or more instructions, when executed by one or more processors of a UE, may cause the one or more processors to transmit an indication of a beam switching capability of the UE as a multiple of a physical layer timing unit for a wireless network in which the UE is located; and receive one or more scheduling grants that are based at least in part on the beam switching capability of the UE.

In some aspects, a non-transitory computer-readable medium may store one or more instructions for wireless communication. The one or more instructions, when executed by one or more processors of a BS, may cause the one or more processors to receive an indication of a beam switching capability of a UE as a multiple of a physical layer timing unit for a wireless network in which the BS and the UE are located; and transmit one or more scheduling grants based at least in part on the beam switching capability of the UE.

In some aspects, an apparatus for wireless communication may include means for transmitting an indication of a beam switching capability of a user equipment (UE) as a multiple of a physical layer timing unit for a wireless network in which the UE is located; and means for receiving one or more scheduling grants that are based at least in part on the beam switching capability of the UE.

In some aspects, an apparatus for wireless communication may include means for receiving an indication of a beam switching capability of a user equipment (UE) as a multiple of a physical layer timing unit for a wireless network in which the BS and the UE are located; and means for transmitting one or more scheduling grants based at least in part on the beam switching capability of the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, and/or algorithms (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
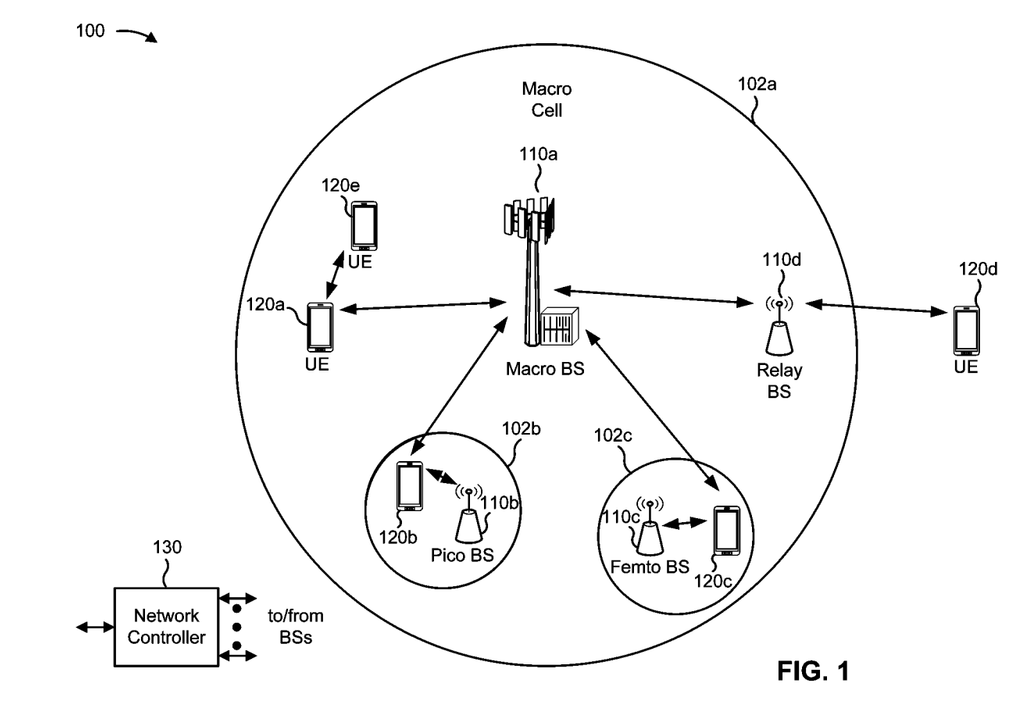
FIG. 1 is a diagram illustrating an example of a wireless communication network, in accordance with the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, and/or a transmit receive point (TRP), among other examples. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or another type of backhaul interface using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, or a relay, among other examples.

Wireless network 100 may be a heterogeneous network that includes BSs of different types, e.g., macro BSs, pico BSs, femto BSs, relay BSs, and/or other types of BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, for example, directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, or a station, among other examples. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
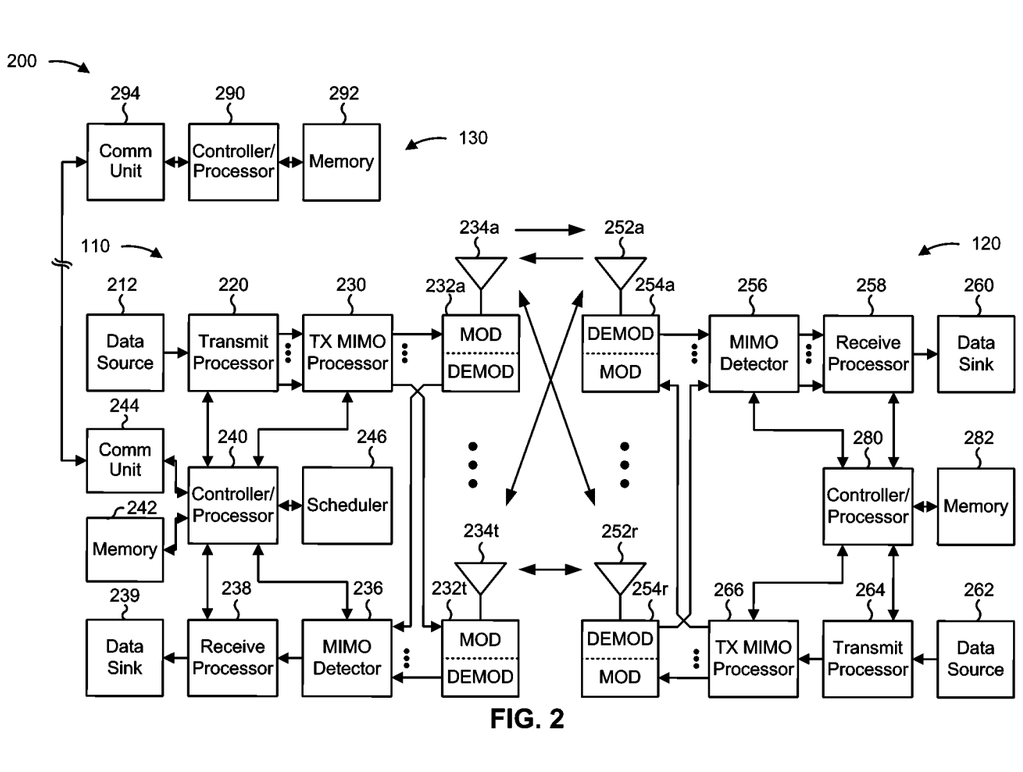
FIG. 2 is a diagram illustrating an example of a base station in communication with a user equipment (UE) in a wireless communication network, in accordance with the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., semi-static resource partitioning information (SRPI)) and control information (e.g., CQI requests, grants, and/or upper layer signaling, among other examples), and may provide overhead symbols and control symbols. Transmit processor 220 may also generate reference symbols for reference signals (e.g., a cell-specific reference signal (CRS), a demodulation reference signal (DMRS)) and synchronization signals (e.g., a primary synchronization signal (PSS) and/or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, a channel quality indicator (CQI) parameter, and/or other parameters. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. In some aspects, a modulator and a demodulator (e.g., MOD/DEMOD 232) of the base station 110 may be included in a modem of the base station 110. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

Controller/processor 240 of base station 110, controller/processor 280 of UE 120, and/or any other component(s) of FIG. 2 may perform one or more techniques associated with UE beam switching capability reporting and associated scheduling, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 400 of FIG. 4, process 500 of FIG. 5, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for transmitting an indication of a beam switching capability of the UE as a multiple of a physical layer timing unit for a wireless network in which the UE is located, means for receiving one or more scheduling grants that are based at least in part on the beam switching capability of the UE, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving an indication of a beam switching capability of a UE as a multiple of a physical layer timing unit for a wireless network in which the BS and the UE are located, means for transmitting one or more scheduling grants based at least in part on the beam switching capability of the UE, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In a wireless network, different transmissions may use different beams (e.g., different transmit and/or different receive beams). It may take some time (e.g., around 0.1 μs in some example implementations) for a wireless communication device, such as a BS or UE, to switch between beams (e.g., to switch, activate/deactivate, and/or retune radio frequency (RF) components of the wireless communication device between different beams). The time for switching beams may be based at least in part on the capability of the wireless communication device. For example, a lower capability UE and/or BS may take longer to switch beams relative to a higher capability UE and/or BS, which may take a shorter time to switch beams.

In some cases, a cyclic prefix (CP) is used to cover the time that is used for switching the beams. The length of the CP may be based at least in part on the subcarrier spacing (SCS) associated with an operating frequency. For example, in frequency range (FR2) mmW with a 60 kHz or 120 kHz SCS, the CP length of 1.725 μs and 0.5625 μs, respectively, may be sufficient to cover the beam switching (e.g., as both are significantly longer than a 0.1 μs beam switching duration). However, in certain wireless networks, such as high frequency band wireless networks (e.g., 52.6 GHz or higher), a larger SCS may be used. As the frequency of the wireless network increases, symbol durations and CP lengths decrease. For example, at 480 kHz SCS the CP length is 0.14656 μs and at 3840 kHz SCS the CP length is down to 0.01832 μs. Thus, at the higher SCS, the CP length may be insufficient to cover the beam switching duration. Therefore, where the CP length is insufficient to cover the beam switching duration, a UE may have to puncture (e.g., drop) one or more symbols associated with a beam to complete the beam switching. This may consume network resources (e.g., time, frequency, and/or spatial resources), UE resources (e.g., memory resources, processor resources, and/or the like), BS resources, and/or the like associated with identifying issues (e.g., decoding issues, demodulation issues, and/or the like) associated with one or more punctured symbols, remedying the issues, and/or the like.

Some aspects described herein provide techniques and apparatuses for user equipment beam switching capability reporting and associated scheduling. In some aspects, a UE may report a beam switching capability as a multiple of a physical layer timing unit for the wireless network in which the UE is located (e.g., a 5G NR physical layer timing unit). The time duration of the physical layer timing unit may be a constant value that is independent of the SCS and symbol duration of the operating frequency on which the UE and BS are communicating. Accordingly, reporting the beam switching capability of the UE as a multiple of the physical layer timing unit permits the UE to report the beam switching capability in an accurate and consistent manner, regardless of the operating frequency used by the UE an the BS.

Moreover, the physical layer timing unit may be a relatively small duration (e.g., 0.509 ns and/or the like), which permits the UE to report the beam switching capability at a more granular level such that the BS may more flexibly schedule communication for the UE in a manner that reduces the quantity of symbols that are punctured (e.g., dropped and/or the like) when switching beams. In addition, reporting the beam switching capability of the UE as a multiple of a physical layer timing unit for the wireless network in which the UE is located may conserve network resources (e.g., time, frequency, and/or spatial resources), UE resources (e.g., memory resources, processor resources, and/or the like), BS resources, and/or the like that would have otherwise been used identifying issues (e.g., decoding issues, demodulation issues, and/or the like) associated with one or more punctured symbols, remedying the issues, and/or the like.

Figure 3A:
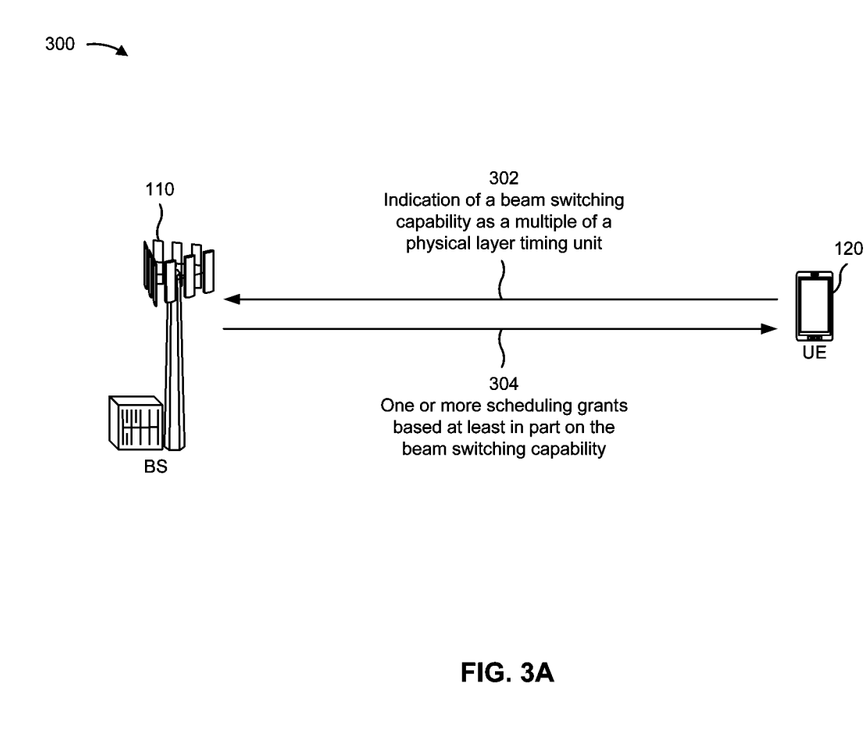
FIGS. 3A-3C are diagrams illustrating one or more examples of user equipment beam switching capability reporting and associated scheduling, in accordance with the present disclosure.
Figure 3B:
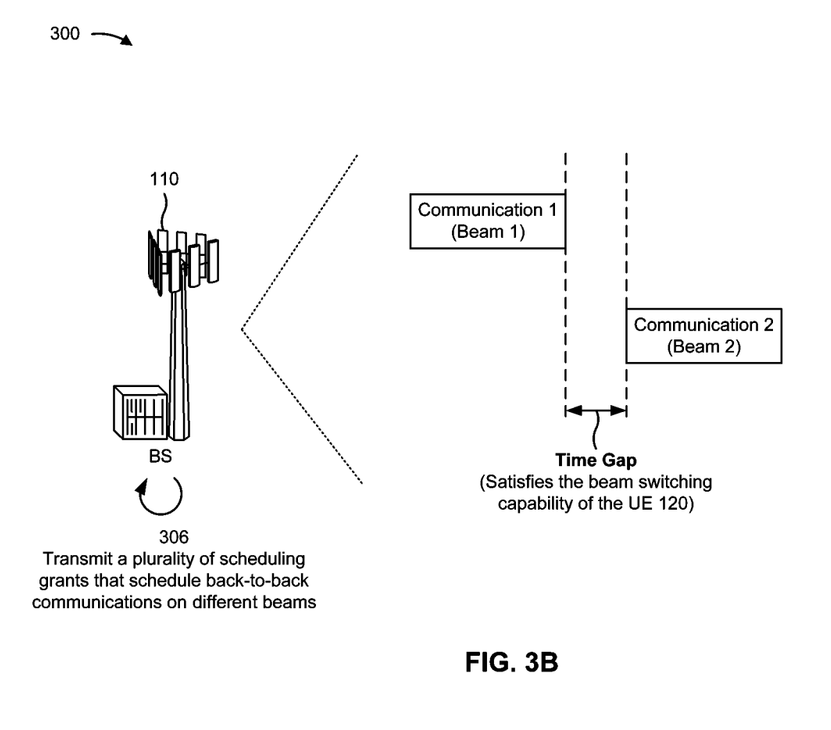
Figure 3C:
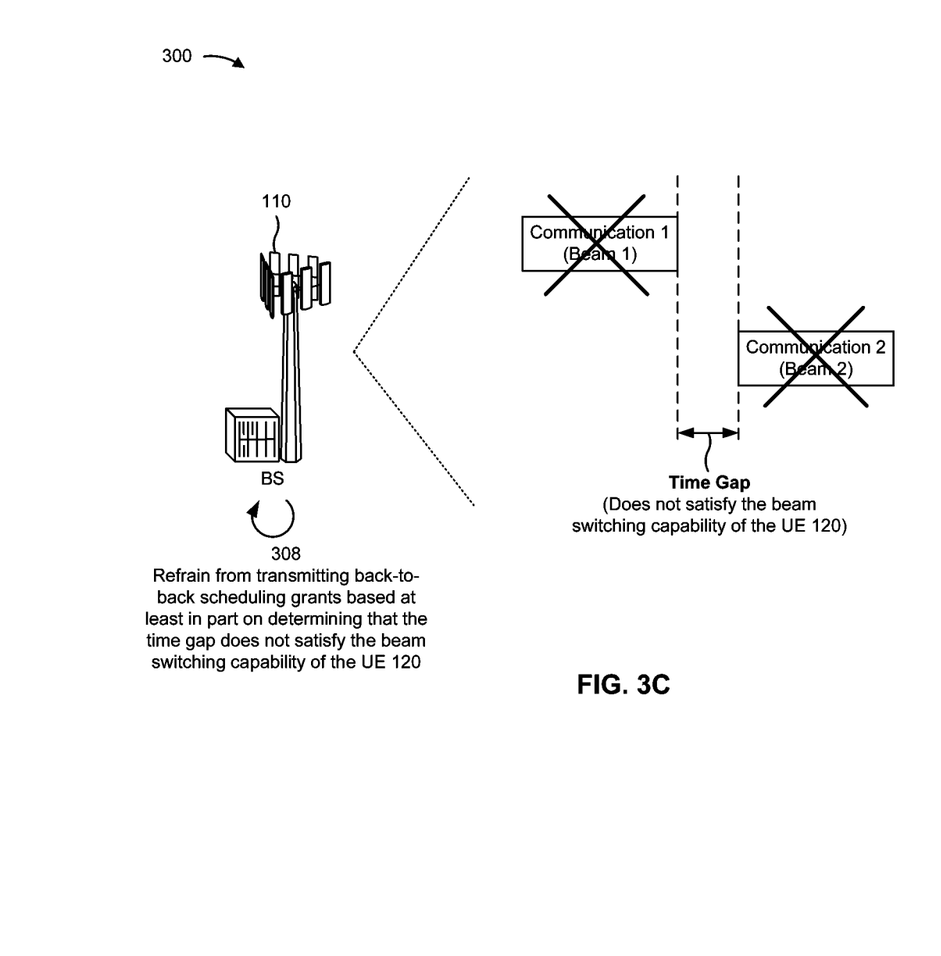

FIGS. 3A-3C are diagrams illustrating one or more examples 300 of user equipment beam switching capability reporting and associated scheduling, in accordance with the present disclosure. As shown in FIGS. 3A-3C, example(s) 300 may include communication between a BS 110 (e.g., BS 110 illustrated and described above in connection with FIGS. 1 and 2) and a UE 120 (e.g., UE 120 illustrated and described above in connection with FIGS. 1 and 2). The BS 110 and the UE 120 may be included in a wireless network, such as wireless network 100. The BS 110 and the UE 120 may communicate on a wireless access link, which may include an uplink and a downlink.

As shown in FIG. 3A, and by reference number 302, UE 120 may transmit an indication of a beam switching capability of UE 120 to BS 110 as a multiple of a physical layer timing unit (Tc). The Tc may be based at least in part on the wireless network (e.g., wireless network 100) in which the UE 120 is located. The Tc may be based at least in part on the maximum SCS for the wireless network (e.g., 480 kHz and/or the like). The Tc may remain a constant value (e.g., 0.509 ns and/or the like) for the wireless network, regardless of the SCS and symbol duration of the operating frequency on which the UE 120 is communicating.

In some aspects, the Tc for the wireless network may be multiplied by a coefficient (K) for the purposes of reporting the beam switching capability of the UE 120 in the wireless network. K may be an integer number or scaling factor. K may be configured by UE 120 and/or BS 110, may be based at least in part on one or more telecommunication standards, may be based at least in part on one or more telecommunication specifications (e.g., 3GPP 5G specifications), may be based at least in part on the wireless network in which BS 110 and UE 120 are located, may be based at least in part on the operating frequency on which BS 110 and UE 120 are communicating, and/or the like.

In some aspects, UE 120 may indicate the beam switching capability of UE 120 as one or more units or multiples of KTc. In particular, UE 120 may transmit an indication of the beam switching capability of UE 120 to BS 110 as one or more units or multiples of KTc. For example, UE 120 may indicate that the beam switching capability of UE 120 is a multiple of 4 of KTc (e.g., 4KTc). In some aspects, UE 120 may indicate the beam switching capability of UE 120 as the number of units or multiples of KTc (e.g., the transmission from UE 120 may indicate only the number of units of KTc, such as 5, 10, and/or the like). In these cases, the BS 110 may be configured to determine the beam switching capability of UE 120 by multiplying the reported unit or multiple by KTc.

In some aspects, UE 120 may indicate the beam switching capability of UE 120 as the number of units of KTc multiplied by K (e.g., the transmission from UE 120 may indicate only the number of units multiplied by K, for example if K is 32 and the number of units is 4, UE 120 may indicate the beam switching capability of UE 120 as 128Tc). In some aspects, UE 120 may indicate the beam switching capability of UE 120 as the amount of time equivalent to the number of units multiplied by KTc (e.g., if Tc is 0.509 ns, K is 32, and the number of units is 4, UE 120 may indicate the beam switching capability of UE 120 as 65.152 ns).

As shown by reference number 304, BS 110 may transmit, to UE 120, one or more scheduling grants based at least in part on the indicated beam switching capability of UE 120. BS 110 may receive the indication of the beam switching capability of UE 120 as a multiple of the Tc (e.g., as one or more units or multiples of the Tc, as one or more units of KTc, and/or the like). For example, if UE 120 indicates that the beam switching capability of UE 120 is 3 KTc and BS 110 determines that K is 32, BS 110 may interpret the beam switching capability of UE 120 as 3 KTc to mean that UE 120 needs 96$c$ (e.g., 3 multiplied by 32), or 48.864 ns (e.g., if Tc is 0.509 ns), to switch between different beams. BS 110 may transmit one or more scheduling grants to UE 120 based at least in part on the amount of time UE 120 needs to switch between different beams (e.g., the beam switching capability of UE 120).

As shown in FIG. 3B, and by reference number 306, BS 110 may transmit a plurality of scheduling grants that schedule back-to-back communications of different beams based at least in part on a time gap between the different beams satisfying the beam switching capability of UE 120. The scheduling grants that schedule back-to-back communications of different beams may be physical uplink shared channel (PUSCH) scheduling grants, physical uplink control channel (PUCCH) scheduling grants, physical downlink shared channel (PDSCH) scheduling grants, physical uplink control channel (PUCCH) scheduling grants, or combinations thereof. In general, the scheduling grants may schedule back-to-back transmissions, back-to-back reception, a back-to-back transmission and reception, or a back-to-back reception and transmission of data communications, control communications, and/or a combination thereof.

For example, BS 110 may transmit a plurality of scheduling grants that schedule back-to-back communications of a first communication (e.g., communication 1) of a first beam (e.g., beam 1) followed by a second communication (e.g., communication 2) of a second beam (e.g., beam 2). In some aspects, communication 1 may be a first PUSCH transmission and communication 2 may be a second PUSCH transmission. In some aspects, communication 1 may be a PUSCH transmission and communication 2 may be a PDSCH transmission. In some aspects, communication 1 may be a first PDSCH transmission and communication 2 may be a second PDSCH transmission. In some aspects, communication 1 may be a PDSCH transmission and communication 2 may be a PUSCH transmission. These are simply examples of types of transmissions that may be scheduled back-to-back by BS 110.

BS 110 may identify a time gap between communication 1 and communication 2 (e.g., between beam 1 and beam 2). BS 110 may identify that the time gap satisfies the beam switching capability of UE 120 (e.g., the time gap provides enough time for UE 120 to switch from beam 1 to beam 2). BS 110 may transmit one or more scheduling grants that schedule communication 1 (e.g., on beam 1) and communication 2 (e.g., on beam 2) based at least in part of the time gap between beam 1 and beam 2 satisfying the beam switching capability of UE 120. BS 110 may transmit a plurality of scheduling grants that schedule a plurality of back-to-back communications on different beams in a similar (or the same) manner as described herein.

UE 120 may receive the one or more scheduling grants that are based at least in part on the beam switching capability of UE 120 and that schedule one or more back-to-back communications (e.g., back-to-back PUSCH transmissions, back-to-back PDSCH transmissions, a PUSCH transmission followed by a PDSCH transmission, a PDSCH transmission followed by a PUSCH transmission, and/or the like) on different beams. UE 120 may communicate, based at least in part on the one or more scheduling grants, the back-to-back communications by switching between the different beams of the back-to-back communications (e.g., based at least in part on the time gap between the different beams satisfying the beam switching capability of UE 120).

As shown in FIG. 3C, and by reference number 308, BS 110 may refrain from transmitting back-to-back scheduling grants scheduling back-to-back communications on different beams based at least in part on determining that the time gap between the different beams does not satisfy the beam switching capability of UE 120. For example, BS 110 may identify that the time gap between beam 1 and beam 2 does not satisfy the beam switching capability of UE 120 (e.g., the time gap does not provide enough time for UE 120 to switch from beam 1 to beam 2). BS 110 may not transmit the one or more scheduling grants that schedule communication 1 (e.g., on beam 1) and communication 2 (e.g., on beam 2) based at least in part of the time gap between beam 1 and beam 2 not satisfying the beam switching capability of UE 120.

As such, UE 120 may not receive the one or more scheduling grants that schedule one or more back-to-back communications and may not communicate the back-to-back communications, based at least in part on the time gap between the different beams of the back-to-back communications not satisfying the beam switching capability of UE 120. In this way, BS 110 will not schedule UE 120 to switch between different beams where the time gap between the different beams does not allow enough time for UE 120 to switch between the different beams. This ensures that UE 120 will not have to puncture one or more symbols of one (or both) of the different beams to switch between the different beams. This may conserve network resources, UE resources, BS resources, and/or the like that would have otherwise been used identifying issues (e.g., decoding issues, demodulation issues, and/or the like) associated with one or more punctured symbols, remedying the issues, and/or the like.

As indicated above, FIGS. 3A-3C are provided as one or more examples. Other examples may differ from what is described with respect to FIGS. 3A-3C.

Figure 4:
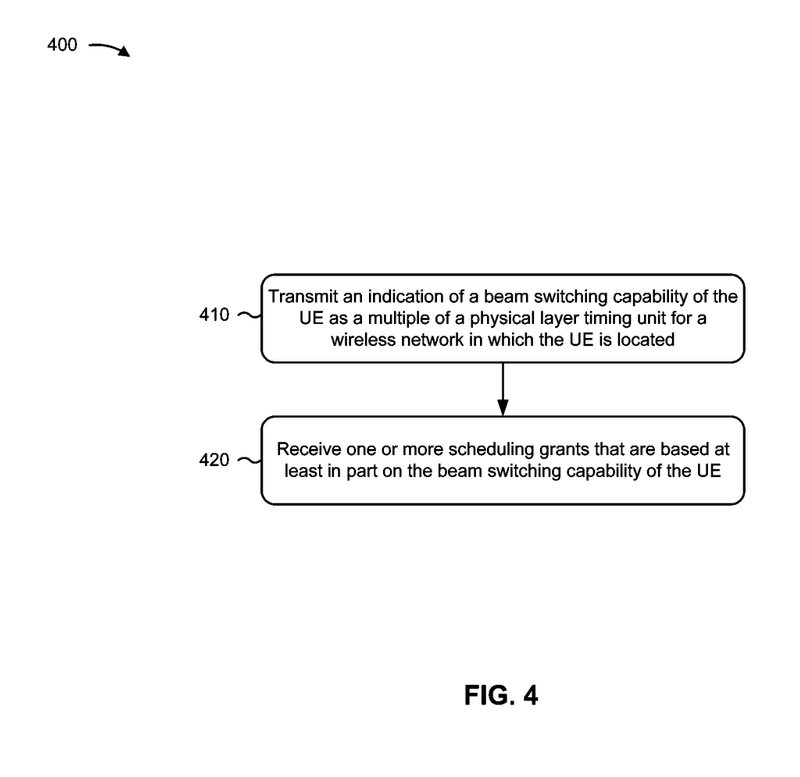
FIG. 4 is a diagram illustrating an example process performed, for example, by a user equipment, in accordance with the present disclosure.

FIG. 4 is a diagram illustrating an example process 400 performed, for example, by a user equipment, in accordance with the present disclosure. Example process 400 is an example where the user equipment (e.g., UE 120 illustrated and described above in connection with one or more of FIGS. 1, 2, and/or 3A-3C, and/or the like) performs operations associated with UE beam switching capability reporting and associated scheduling.

As shown in FIG. 4, in some aspects, process 400 may include transmitting an indication of a beam switching capability of the UE as a multiple of a physical layer timing unit for a wireless network in which the UE is located (block 410). For example, the user equipment (e.g., using receive processor 258, transmit processor 264, controller/processor 280, memory 282, and/or the like) may transmit an indication of a beam switching capability of the UE as a multiple of a physical layer timing unit for a wireless network in which the UE is located, as described above.

As further shown in FIG. 4, in some aspects, process 400 may include receiving one or more scheduling grants that are based at least in part on the beam switching capability of the UE (block 420). For example, the user equipment (e.g., using receive processor 258, transmit processor 264, controller/processor 280, memory 282, and/or the like) may receive one or more scheduling grants that are based at least in part on the beam switching capability of the UE, as described above.

Process 400 may include additional aspects, such as any single aspect or any combination of aspects described below and/or in connection with one or more other processes described elsewhere herein.

In a first aspect, the one or more scheduling grants include a plurality of back-to-back communication scheduling grants; the plurality of back-to-back communication scheduling grants includes: a first communication scheduling grant that schedules a first communication transmission on a first beam, wherein the first communication scheduling grant is a PUSCH scheduling grant and the first communication transmission is a PUSCH transmission, or wherein the first communication scheduling grant is a PDSCH scheduling grant and the first communication transmission is a PDSCH transmission, and a second communication scheduling grant that schedules a second communication transmission on a second beam, wherein the second communication scheduling grant is a PUSCH scheduling grant and the second communication transmission is a PUSCH transmission, or the second communication scheduling grant is a PDSCH scheduling grant and the second communication transmission is a PDSCH transmission, and a time gap between the first communication transmission and the second communication transmission satisfies the beam switching capability of the UE.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
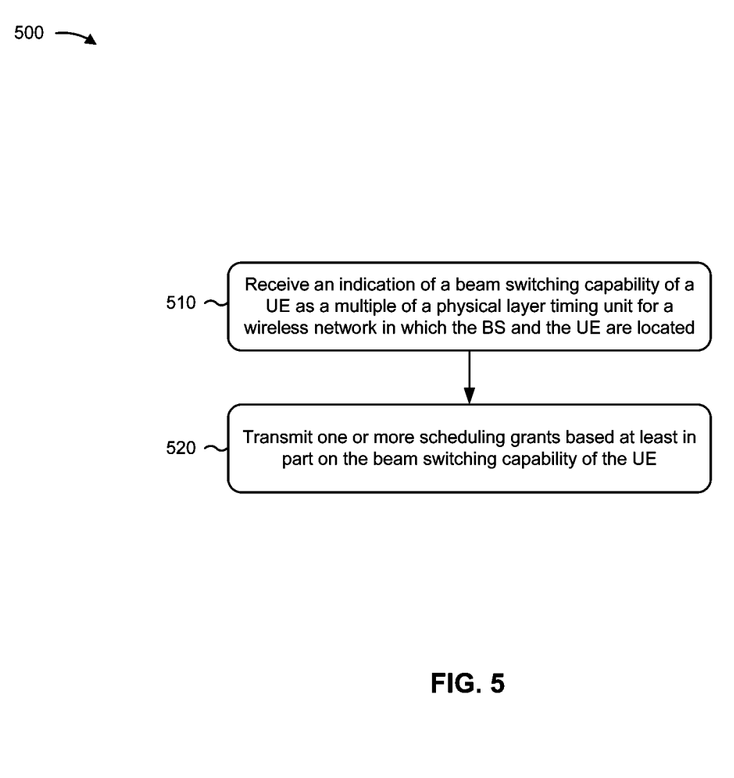
FIG. 5 is a diagram illustrating an example process performed, for example, by a base station, in accordance with the present disclosure.

FIG. 5 is a diagram illustrating an example process 500 performed, for example, by a base station, in accordance with the present disclosure. Example process 500 is an example where the base station (e.g., BS 110 illustrated and described above in connection with one or more of FIGS. 1, 2, and/or 3A-3C, and/or the like) performs operations associated with UE beam switching capability reporting and associated scheduling.

As shown in FIG. 5, in some aspects, process 500 may include receiving an indication of a beam switching capability of a UE as a multiple of a physical layer timing unit for a wireless network in which the BS and the UE are located (block 510). For example, the base station (e.g., using transmit processor 220, receive processor 238, controller/processor 240, memory 242, and/or the like) may receive an indication of a beam switching capability of a UE as a multiple of a physical layer timing unit for a wireless network in which the BS and the UE are located, as described above.

As further shown in FIG. 5, in some aspects, process 500 may include transmitting one or more scheduling grants based at least in part on the beam switching capability of the UE (block 520). For example, the base station (e.g., using transmit processor 220, receive processor 238, controller/processor 240, memory 242, and/or the like) may transmit one or more scheduling grants based at least in part on the beam switching capability of the UE, as described above.

Process 500 may include additional aspects, such as any single aspect or any combination of aspects described below and/or in connection with one or more other processes described elsewhere herein.

In a first aspect, process 500 includes refraining from transmitting a plurality of back-to-back communication scheduling grants based at least in part on determining that a time gap between the plurality of back-to-back communication scheduling grants does not satisfy the beam switching capability of the UE.

In a second aspect, alone or in combination with the first aspect, transmitting the one or more scheduling grants comprises: transmitting a plurality of back-to-back communication scheduling grants that includes: a first communication scheduling grant that schedules a first communication transmission on a first beam, wherein the first communication scheduling grant is a PUSCH scheduling grant and the first communication transmission is a PUSCH transmission, or wherein the first communication scheduling grant is a PDSCH scheduling grant and the first communication transmission is a PDSCH transmission, and a second communication scheduling grant that schedules a second communication transmission on a second beam, wherein the second communication scheduling grant is a PUSCH scheduling grant and the second communication transmission is a PUSCH transmission, or wherein the second communication scheduling grant is a PDSCH scheduling grant and the second communication transmission is a PDSCH transmission, and a time gap, between the first communication transmission and the second communication transmission, satisfies the beam switching capability of the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some aspects of the present disclosure:

Aspect 1: A method of wireless communication performed by a user equipment (UE), comprising: transmitting an indication of a beam switching capability of the UE as a multiple of a physical layer timing unit for a wireless network in which the UE is located; and receiving one or more scheduling grants that are based at least in part on the beam switching capability of the UE.

Aspect 2: The method of aspect 1, wherein the one or more scheduling grants include a plurality of back-to-back communication scheduling grants; and wherein the plurality of back-to-back communication scheduling grants includes a first communication scheduling grant that schedules a first communication transmission on a first beam. Aspect 3: The method of aspect 2, wherein the first communication scheduling grant is a physical uplink shared channel (PUSCH) scheduling grant and the first communication transmission is a PUSCH transmission. Aspect 4: The method of aspect 2, wherein the first communication scheduling grant is a physical downlink shared channel (PDSCH) scheduling grant and the first communication transmission is a PDSCH transmission.

Aspect 5: The method of any of aspects 2-4, wherein the plurality of back-to-back communication scheduling grants includes a second communication scheduling grant that schedules a second communication transmission on a second beam. Aspect 6: The method of aspect 5, wherein the second communication scheduling grant is a physical uplink shared channel (PUSCH) scheduling grant and the second communication transmission is a PUSCH transmission. Aspect 7: The method of aspect wherein the second communication scheduling grant is a physical downlink shared channel (PDSCH) scheduling grant and the second communication transmission is a PDSCH transmission. Aspect 8: The method of any of aspects 5-7, wherein a time gap between the first communication transmission and the second communication transmission satisfies the beam switching capability of the UE.

Aspect 9: A method of wireless communication performed by a base station (BS), comprising: receiving an indication of a beam switching capability of a user equipment (UE) as a multiple of a physical layer timing unit for a wireless network in which the BS and the UE are located; and transmitting one or more scheduling grants based at least in part on the beam switching capability of the UE.

Aspect 10: The method of aspect 9, further comprising: refraining from transmitting a plurality of back-to-back communication scheduling grants based at least in part on determining that a time gap between the plurality of back-to-back communication scheduling grants does not satisfy the beam switching capability of the UE. Aspect 11: The method of aspect 9 or 10, wherein transmitting the one or more scheduling grants comprises: transmitting a plurality of back-to-back communication scheduling grants that includes a first communication scheduling grant that schedules a first communication transmission on a first beam.

Aspect 12: The method of aspect 11, wherein the first communication scheduling grant is a physical uplink shared channel (PUSCH) scheduling grant and the first communication transmission is a PUSCH transmission. Aspect 13: The method of aspect 11, wherein the first communication scheduling grant is a physical downlink shared channel (PDSCH) scheduling grant and the first communication transmission is a PDSCH transmission. Aspect 14: The method of any of aspects 11-13, wherein the plurality of back-to-back communication scheduling grants includes a second communication scheduling grant that schedules a second communication transmission on a second beam.

Aspect 15: The method of aspect 14, wherein the second communication scheduling grant is a physical uplink shared channel (PUSCH) scheduling grant and the second communication transmission is a PUSCH transmission. Aspect 16: The method of aspect 14, wherein the second communication scheduling grant is a physical downlink shared channel (PDSCH) scheduling grant and the second communication transmission is a PDSCH transmission. Aspect 17: The method of any of aspects 14-16, wherein a time gap, between the first communication transmission and the second communication transmission, satisfies the beam switching capability of the UE.

Aspect 18: An apparatus for wireless communication at a device, comprising a processor; memory coupled with the processor; and instructions stored in the memory and executable by the processor to cause the apparatus to perform the method of one or more aspects of aspects 1-8. Aspect 19: A device for wireless communication, comprising a memory and one or more processors coupled to the memory, the memory and the one or more processors configured to perform the method of one or more aspects of aspects 1-8.

Aspect 20: An apparatus for wireless communication, comprising at least one means for performing the method of one or more aspects of aspects 1-8. Aspect 21: A non-transitory computer-readable medium storing code for wireless communication, the code comprising instructions executable by a processor to perform the method of one or more aspects of aspects 1-8. Aspect 22: A non-transitory computer-readable medium storing a set of instructions for wireless communication, the set of instructions comprising one or more instructions that, when executed by one or more processors of a device, cause the device to perform the method of one or more aspects of aspects 1-8.

Aspect 23: An apparatus for wireless communication at a device, comprising a processor; memory coupled with the processor; and instructions stored in the memory and executable by the processor to cause the apparatus to perform the method of one or more aspects of aspects 9-17. Aspect 24: A device for wireless communication, comprising a memory and one or more processors coupled to the memory, the memory and the one or more processors configured to perform the method of one or more aspects of aspects 9-17.

Aspect 25: An apparatus for wireless communication, comprising at least one means for performing the method of one or more aspects of aspects 9-17. Aspect 26: A non-transitory computer-readable medium storing code for wireless communication, the code comprising instructions executable by a processor to perform the method of one or more aspects of aspects 9-17. Aspect 27: A non-transitory computer-readable medium storing a set of instructions for wireless communication, the set of instructions comprising one or more instructions that, when executed by one or more processors of a device, cause the device to perform the method of one or more aspects of aspects 9-17.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software.

The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting an indication of a beam switching capability of the UE, the indication being a multiplication of a physical layer timing unit that is based at least in part on a maximum subcarrier spacing for a wireless network in which the UE is located, the physical layer timing unit being a constant value that is independent of a symbol duration of an operating frequency on which the UE communicates, and the constant value being a time duration; and
    receiving one or more scheduling grants that are based at least in part on the beam switching capability of the UE.

2. The method of claim 1, wherein the one or more scheduling grants include a plurality of back-to-back communication scheduling grants; and
    wherein the plurality of back-to-back communication scheduling grants includes a first communication scheduling grant that schedules a first communication transmission on a first beam.

3. The method of claim 2, wherein the first communication scheduling grant is a physical uplink shared channel (PUSCH) scheduling grant and the first communication transmission is a PUSCH transmission.

4. The method of claim 2, wherein the first communication scheduling grant is a physical downlink shared channel (PDSCH) scheduling grant and the first communication transmission is a PDSCH transmission.

5. The method of claim 2, wherein the plurality of back-to-back communication scheduling grants includes a second communication scheduling grant that schedules a second communication transmission on a second beam.

6. The method of claim 5, wherein the second communication scheduling grant is a physical uplink shared channel (PUSCH) scheduling grant and the second communication transmission is a PUSCH transmission.

7. The method of claim 5, wherein the second communication scheduling grant is a physical downlink shared channel (PDSCH) scheduling grant and the second communication transmission is a PDSCH transmission.

8. The method of claim 5, wherein a time gap between the first communication transmission and the second communication transmission satisfies the beam switching capability of the UE.

9. A method of wireless communication performed by a base station (BS), comprising:
    receiving an indication of a beam switching capability of a user equipment (UE), the indication being a multiplication of a physical layer timing unit that is based at least in part on a maximum subcarrier spacing for a wireless network in which the BS and the UE are located, the physical layer timing unit being a constant value that is independent of a symbol duration of an operating frequency on which the UE communicates, and the constant value being a time duration; and
    transmitting one or more scheduling grants based at least in part on the beam switching capability of the UE.

10. The method of claim 9, further comprising:
    refraining from transmitting a plurality of back-to-back communication scheduling grants based at least in part on determining that a time gap between the plurality of back-to-back communication scheduling grants does not satisfy the beam switching capability of the UE.

11. The method of claim 9, wherein transmitting the one or more scheduling grants comprises:
    transmitting a plurality of back-to-back communication scheduling grants that includes a first communication scheduling grant that schedules a first communication transmission on a first beam.

12. The method of claim 11, wherein the first communication scheduling grant is a physical uplink shared channel (PUSCH) scheduling grant and the first communication transmission is a PUSCH transmission.

13. The method of claim 11, wherein the first communication scheduling grant is a physical downlink shared channel (PDSCH) scheduling grant and the first communication transmission is a PDSCH transmission.

14. The method of claim 11, wherein the plurality of back-to-back communication scheduling grants includes a second communication scheduling grant that schedules a second communication transmission on a second beam.

15. The method of claim 14, wherein the second communication scheduling grant is a physical uplink shared channel (PUSCH) scheduling grant and the second communication transmission is a PUSCH transmission.

16. The method of claim 14, wherein the second communication scheduling grant is a physical downlink shared channel (PDSCH) scheduling grant and the second communication transmission is a PDSCH transmission.

17. The method of claim 14, wherein a time gap, between the first communication transmission and the second communication transmission, satisfies the beam switching capability of the UE.

18. A user equipment (UE) for wireless communication, comprising:
one or more memories; and
one or more processors coupled to the one or more memories, the one or more processors configured to cause the UE to:
transmit an indication of a beam switching capability of the UE, the indication being a multiplication of a physical layer timing unit that is based at least in part on a maximum subcarrier spacing for a wireless network in which the UE is located, the physical layer timing unit being a constant value that is independent of a symbol duration of an operating frequency on which the UE communicates, and the constant value being a time duration; and
receive one or more scheduling grants that are based at least in part on the beam switching capability of the UE.

19. The UE of claim 18, wherein the one or more scheduling grants include a plurality of back-to-back communication scheduling grants; and
wherein the plurality of back-to-back communication scheduling grants includes a first communication scheduling grant that schedules a first communication transmission on a first beam.

20. The UE of claim 19, wherein the first communication scheduling grant is a physical uplink shared channel (PUSCH) scheduling grant and the first communication transmission is a PUSCH transmission, or
wherein the first communication scheduling grant is a physical downlink shared channel (PDSCH) scheduling grant and the first communication transmission is a PDSCH transmission.

21. The UE of claim 19, wherein the plurality of back-to-back communication scheduling grants includes a second communication scheduling grant that schedules a second communication transmission on a second beam.

22. The UE of claim 21, wherein the second communication scheduling grant is a physical uplink shared channel (PUSCH) scheduling grant and the second communication transmission is a PUSCH transmission, or
wherein the second communication scheduling grant is a physical downlink shared channel (PDSCH) scheduling grant and the second communication transmission is a PDSCH transmission.

23. The UE of claim 21, wherein a time gap between the first communication transmission and the second communication transmission satisfies the beam switching capability of the UE.

24. A base station (BS) for wireless communication, comprising:
one or more memories; and
one or more processors coupled to the one or more memories, the one or more processors configured to cause the BS to:
receive an indication of a beam switching capability of a user equipment (UE), the indication being a multiplication of a physical layer timing unit that is based at least in part on a maximum subcarrier spacing for a wireless network in which the BS and the UE are located, the physical layer timing unit being a constant value that is independent of a symbol duration of an operating frequency on which the UE communicates, and the constant value being a time duration; and
transmit one or more scheduling grants based at least in part on the beam switching capability of the UE.

25. The BS of claim 24, wherein the one or more processors are further configured to cause the BS to:
refrain from transmitting a plurality of back-to-back communication scheduling grants based at least in part on determining that a time gap between the plurality of back-to-back communication scheduling grants does not satisfy the beam switching capability of the UE.

26. The BS of claim 24, wherein the one or more processors, to transmit the one or more scheduling grants, are configured to cause the BS to:
transmit a plurality of back-to-back communication scheduling grants that includes a first communication scheduling grant that schedules a first communication transmission on a first beam.

27. The BS of claim 26, wherein the first communication scheduling grant is a physical uplink shared channel (PUSCH) scheduling grant and the first communication transmission is a PUSCH transmission, or
wherein the first communication scheduling grant is a physical downlink shared channel (PDSCH) scheduling grant and the first communication transmission is a PDSCH transmission.

28. The BS of claim 26, wherein the plurality of back-to-back communication scheduling grants includes a second communication scheduling grant that schedules a second communication transmission on a second beam.

29. The BS of claim 28, wherein the second communication scheduling grant is a physical uplink shared channel (PUSCH) scheduling grant and the second communication transmission is a PUSCH transmission, or
wherein the second communication scheduling grant is a physical downlink shared channel (PDSCH) scheduling grant and the second communication transmission is a PDSCH transmission.

30. The BS of claim 28, wherein a time gap, between the first communication transmission and the second communication transmission, satisfies the beam switching capability of the UE.

* * * * *